Aug. 11, 1970   C. M. CASON III   3,523,452

DEVICE FOR MEASURING IONIZED GAS VELOCITY AND TURBULENCE

Filed June 13, 1968

Charles M. Cason, III.
INVENTOR.

United States Patent Office 3,523,452
Patented Aug. 11, 1970

3,523,452
DEVICE FOR MEASURING IONIZED GAS VELOCITY AND TURBULENCE
Charles M. Cason III, Huntsville, Ala., assignor to the United States of America as represented by the Secretary of the Army
Filed June 13, 1968, Ser. No. 736,849
Int. Cl. G01f 1/00
U.S. Cl. 73—194                     4 Claims

ABSTRACT OF THE DISCLOSURE

Two selectable orthogonal magnetic fields are provided. One field is provided by a D-C source, has its flux lines parallel to the direction of gas flow, and may be selectively energized or deenergized. The other field is provided by selectable D-C and A-C sources, and has its flux lines orthogonal to the direction of gas flow. The arrangement is such that when the one field is energized by the D-C source, the other field is energized by the A-C source. When the one field is deenergized, the other field is connected both to the A-C and D-C sources. Three sensing electrodes are arranged parallel to each other and to the direction of gas flow, with a first and second of the electrodes in a first plane parallel to the flux lines of the one magnetic field, and with the second and third electrodes in a second plane normal to the first plane. Outputs taken between coplanar pairs of electrodes are used to determine gas velocity and turbulence by taking advantage of Faraday's law, i.e., when a moving conductor (the ionized gas) moves through a magnetic field $\overline{B}$ at velocity $\overline{V}$, an electric potential $\overline{E}$ is established by the vector cross product $\overline{E} = \overline{V} \times \overline{B}$. In asmuch as both $\overline{E}$ and $\overline{B}$ can be determined, $\overline{V}$ can readily be determined by: $V = E/B$. The turbulence and velocity of the gas, with proper selection of the magnetic fields, can be measured by output equipment to the sensing electrodes.

CROSS-REFERENCE TO A RELATED APPLICATION

A system for measuring the velocity of moving ionized gases is disclosed in my U.S. patent application Ser. No. 423,612, filed Jan. 5, 1965, now Pat. No. 3,343,414, issued Sept. 26, 1967. The present invention incorporates this system.

BACKGROUND OF THE INVENTION

In measurements for wind tunnel calibration, fundamental velocity fluctuations in chemically reacting gas flows, turbulent mixing of reacting gas flows, rocket exhausts, wakes, boundary layer studies, and the spatial distribution of turbulence and velocity fluctuations in reacting gas flows there is a need for a device which will measure velocity and all three components of turbulence in an ionized gas flow.

At present, most of the experimental information available on the local properties of turbulence in gas flows has been restricted to methods of hot wire anemometry. This method uses an electrically heated wire which is small enough that speed fluctuations in a gas flow cause changes in its temperature and hence its resistance. Measurements may be taken of the voltage fluctuations across the wire at constant current. External electrical networks are used to compensate for the wire characteristics and to extend frequency range covered. The result is an instrument which is both complex and difficult to operate. It has a low frequency limit on the velocity fluctuation frequency spectrum covered due to the design of the compensating network and the wire's heat capacity. Its sensitivity diminishes at low gas density. It is hard to use with supersonic flow because both local gas pressure and gas temperature fluctuations unfortunately contribute to the frequency spectrum observed for the hot wire data. One must then take measurements for three different wire temperatures at constant test conditions. All but the effects due to gas velocity fluctuations may then be eliminated by a complicated analysis of the data.

The present invention overcomes these major difficulties and is completely independent of local gas temperature and pressure fluctuations.

SUMMARY OF THE INVENTION

In order to measure the average velocity and turbulence of a moving ionized gas, magnetic fields are provided in the gas. These fields cause electrical potentials to be generated in the gas. The potentials are detected by equipment connected to electrodes in the gas. Proper selection of the fields allows the velocity and the different turbulence components to be determined.

An object of this invention to provide a device for measuring velocity and all three components of turbulence of a gas flow.

Another object of this invention is to provide a device for measuring velocity components of a gas flow which is completely independent of local gas temperature and pressure fluctuations in the gas.

Still another object of this invention is to provide a device which can be used to measure velocity components in both subsonic and supersonic gas flows.

Still further, it is an object of this invention to provide a device for measuring velocity components of gas flows which is simple to build and easy to operate.

Other objects and many of the attendant advantages of this invention will be readily appreciated as the same becomes better understood by reference to the following detailed description when considered in connection with the accompanying drawings.

DESCRIPTION OF THE PREFERRED EMBODIMENT

Figure 1:
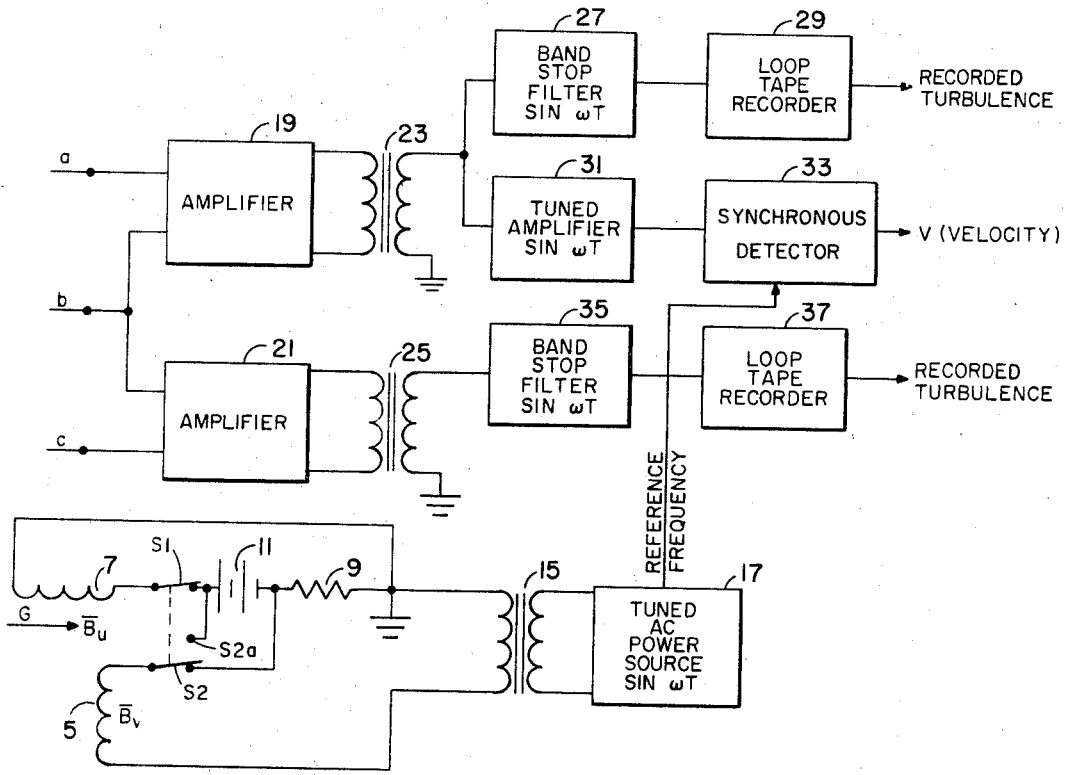
FIG. 1 is a block diagram of a preferred embodiment of the invention.

FIG. 1 of the drawings shows a coil 5 providing magnetic field $\overline{B}_v$ traverse to gas flow G and coil 7 providing a magnetic field $\overline{B}_u$ parallel to gas flow G. Coil 7 is connected in series with a resistor 9 provided for current measurement, battery 11 and switch S1. Coil 5 is connected in series with the output coil of isolation transformer 15, resistor 9 and switch S2. Switches S1 and S2 are ganged together. Coil 5 can be connected in series with battery 11 and with the output coil of transformer 15 if the switches are set to make the movable contact of S2 with fixed contact S2a, whereby A-C only or both D-C and A-C may be applied to coil 5. The input coil of transformer 15 is connected to A-C power source 17, which source is tuned to a predetermined operating frequency (sine $\omega T$).

Positioned in fields $\overline{B}_v$ and $\overline{B}_u$ of the flow of ionized gas are electrical probes $a$, $b$, and $c$. These probes are positioned parallel to each other and to the direction of gas flow, in a 90° triangular configuration such that $a$ and $b$ are in a plane parallel to the lines of flux of field $\overline{B}_u$, and probes $b$ and $c$ are in a plane parallel to the lines of field $\overline{B}_v$. Probe $a$ is connected to a first input of a first amplifier 19, while probe $b$ is connected to a second input of amplifier 19 and a first input of a second amplifier 21 and probe $c$ is connected to a second input of amplifier 21.

The outputs of amplifiers 19 and 21 are connected respectfully to input coils of coupling transformers 23 and 25. One end of each of the output coils of transformers 23 and 25 is connected to ground potential. Transformer 23 has the other end of its output coil 23 connected to a first band-stop filter 27. This filter rejects the operating frequency (sin $\omega T$) and allows all other frequencies to pass to a first loop tape recorder 29 which records two ($\bar{u}$ and $\bar{v}$) of the three components of turbulence at separate times under separate conditions which will be discussed later. The velocity of the gas ($\bar{U}$) is measured by amplitude modulation of the A-C operating frequency (sin $\omega T$) which is allowed to pass through a tuned amplifier 31, having its input connected in common with the input to filter 27. The amplitude modulated signal output of amplifier 31 is connected to synchronous detector 33, whose output is a D-C signal proportional to velocity. Detector 33 is provided with a reference frequency by power source 17. The third turbulence component ($\bar{w}$) is measured through the output of transformer 25, which transformer is connected to a second band-stop filter 35, with the filter output connected to a second loop tape recorder 37.

OPERATION

Figure 2:
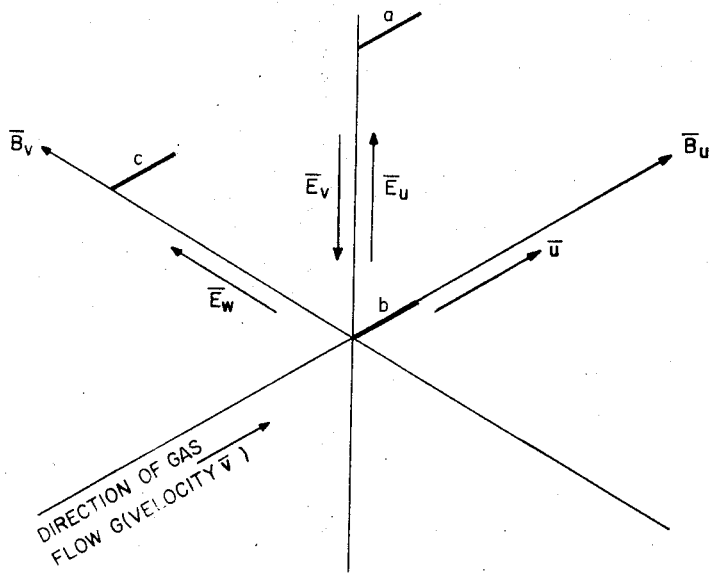
FIG. 2 is a diagrammatic representation of the various field vectors associated with the embodiment of FIG. 1.

The operation of this system can readily be understood by reference to the vector diagram shown in FIG. 2. Plasma flow (the ionized gas) G flows traverse to magnetic field $\bar{B}_v$ and parallel to $\bar{B}_u$. Probes $a$, $b$, and $c$ are aligned in the flow so that voltages $\bar{E}_u$ and $\bar{E}_v$ can be sensed between probes $a$ and $b$. Probe $c$ is disposed from probe $b$ whereby voltage $\bar{E}_w$ can be sensed.

The intensity of turbulence is defined as the r.m.s. value $$\sqrt{\frac{|u^2|}{U}}$$

where $u$ is the flow local velocity fluctuation. When switches S1 and S2 are set to the alternate position from the shown position, the voltage $\bar{E}_u$ (which is defined as the vector cross product $\bar{E}_u = \bar{u} \times \bar{B}_v$) is recorded on loop tape recorder 29 with both D-C and A-C applied across coil 5 while coil 7 is deenergized, that is:

$\bar{E}_{ab} = \bar{E}_u + \bar{E}U = \bar{u} \times \bar{B}_v + \bar{U} \times \bar{B}_v \sin \omega T, \bar{E}_v = 0$
$\bar{E}_{bc} = \bar{E}_w = \bar{w} \times \bar{B}_v$ The component $\bar{v} \times \bar{B}_v$ is extracted by filter 27 and recorded on recorder 29 while the component $\bar{V} \times \bar{B}_v \sin \omega T$, which is the operating frequency sin $\omega T$ applied to coil 7 from source 17, is extracted by tuned amplifier 31 and detector 33, giving a D-C output proportional to the velocity of the gas flow. With switches S1 and S2 in the shown positions, an A-C only is applied across coil 5 while coil 7 has a D-C applied thereto. In this mode, $\bar{E}_u$ and $\bar{E}_w$ are measures of the voltage between probes $a$, $b$, and $c$ as follows:

$\bar{E}_{ab} = \bar{E}_v + \bar{E}U = \bar{v} \times \bar{B}_u + \bar{U} \times \bar{B}_v \sin \omega T, \bar{E}_u = 0$
$\bar{E}_{bc} = \bar{E}_w = \bar{w} \times \bar{B}_u$ The component $\bar{v} \times \bar{B}_v$ is extracted by filter 27 and recorded on recorder 29 while the component $\bar{V} \times B_v \sin \omega T$ is extracted by tuned amplifier 31 and detected by detector 33.

By recording the turbulence components (A-C output voltage signals from the probes) on recorders 29 and 37 as discussed above, one can measure both the r.m.s. value of velocity fluctuations and also the frequency spectrum of velocity flunctuation in gas flows and at a later time spectrum analyze the replay signals from the tape recorders. Conventional spectrum analysis equipment can be used to study the frequency spectrum of both velocity fluctuations and turbulent eddies present from D-C to 50,000 c.p.s. The probable upper frequency capability for spectrum analysis using present off-the-shelf electronic equipment, would be limited by modern tape system's maximum response at 1.5 megahertz.

While the invention has been described with reference to a preferred embodiment thereof, it will be apparent that various modifications and other embodiments thereof will occur to those skilled in the art within the scope of the invention. For example, the voltages between the probes may be measured and displayed on a real time basis rather than recorded. The output of detector 33 could be recorded in similar manner to the outputs of 27 and 35, if desired. The scope of this invention should be limited only by the claims.

I claim:

1. A device for measuring ionized gas velocity and turbulence comprising: means operable in a first mode for providing a first magnetic field having A-C and D-C components whose flux lines are perpendicular to the direction of gas flow, said means being operable in a second mode for providing the A-C component of said first magnetic field and providing a second magnetic field whose magnetic flux lines are parallel to the direction of gas flow; first, second, and third spaced electrical probes disposed parallel to the direction of gas flow and oriented so that a line extending between said first and second probes is perpendicular to said flux lines of said second magnetic field; and means responsive to the voltages between said electrodes.

2. A device as set forth in claim 1 wherein said means for providing said first and second magnetic fields comprises a first coil for producing said first magnetic field, a second coil for producing said second magnetic field, an A-C power source, a D-C power source, said first coil being connected in series with said D-C and said A-C power source in said first mode of operation, said first coil being connected in series with said A-C power source in said second mode of operation, said second coil being connected in series with said D-C power source in said second mode of operation and a switching means for switching from said first to said second mode of operation.

3. The device as set forth in claim 1 wherein said means responsive includes first and second amplifiers each having two input terminals and an output, said first probe connected to one input terminal of said first amplifier, said second probe connected to the other input terminal of said first amplifier and to one input terminal of said second amplifier, said third probe connected to the other input terminal of said second amplifier, recording means, and means connecting said amplifier outputs to recording means.

4. The device as set forth in claim 3 wherein said means connecting includes first and second band stop filters for said A-C, each respectively connected to the output of a respective one of said first and second amplifiers, an amplifier tuned to pass said A-C and connected to said output of said first amplifier, synchronous detector means connected to said tuned amplifier and to said A-C power source, and said recording means includes first and second recorders connected respectively to said first and second band stop filters.

References Cited

UNITED STATES PATENTS

| 3,258,964 | 7/1966 | Zessoules | 73—194 |
| 3,292,079 | 12/1966 | Schindler | 324—40 |
| 3,343,414 | 9/1967 | Cason | 73—194 |

RICHARD C. QUEISSER, Primary Examiner

J. K. LUNSFORD, Assistant Examiner